United States Patent
He et al.

(10) Patent No.: US 10,983,731 B2
(45) Date of Patent: *Apr. 20, 2021

(54) PACKET FORWARDING METHOD, DEVICE, AND SYSTEM IN NON-VOLATILE MEMORY EXPRESS OVER FABRIC

(71) Applicant: Huawei Technologies Co., Ltd., Shenzhen (CN)

(72) Inventors: Jian He, Shenzhen (CN); Xiaoke Ni, Shenzhen (CN); Yimin Yao, Dongguan (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/789,141

(22) Filed: Feb. 12, 2020

(65) Prior Publication Data
US 2020/0183591 A1 Jun. 11, 2020

Related U.S. Application Data

(63) Continuation of application No. 15/961,851, filed on Apr. 24, 2018, now Pat. No. 10,585,628, which is a (Continued)

(51) Int. Cl.
*G06F 3/06* (2006.01)
*G06F 13/42* (2006.01)
(Continued)

(52) U.S. Cl.
CPC .......... *G06F 3/067* (2013.01); *G06F 3/0617* (2013.01); *G06F 3/0629* (2013.01); (Continued)

(58) Field of Classification Search
CPC ...... G06F 3/067; G06F 3/0659; G06F 3/0617; G06F 3/0635; G06F 3/0629; (Continued)

(56) References Cited

U.S. PATENT DOCUMENTS 8,145,785 B1 * 3/2012 Finkelstein ............ H04L 49/70
709/233
8,351,442 B1 * 1/2013 McGlaughlin ........ G06F 13/128
370/401

(Continued)

FOREIGN PATENT DOCUMENTS

CN 1519736 A 8/2004
CN 101763221 A 6/2010
(Continued)

OTHER PUBLICATIONS

U.S. Appl. No. 15/961,851, filed Apr. 24, 2018.

*Primary Examiner* — Frantz B Jean
(74) *Attorney, Agent, or Firm* — Leydig, Voit & Mayer, Ltd.

(57) ABSTRACT

A packet forwarding method, device, and system for use in non-volatile memory express (NVMe) over fabric are described. According to the method, a first packet sent by a control device is received; a second packet is generated according to the first packet; a network port for forwarding the second packet is selected according to an identity of a target non-volatile memory; and the second packet is encapsulated into a packet that meets an NVMe over fabric forwarding requirement, and the encapsulated second packet is sent by using the selected network port.

20 Claims, 8 Drawing Sheets

Related U.S. Application Data continuation of application No. PCT/CN2016/112630, filed on Dec. 28, 2016.

(51) Int. Cl.
  *G06F 13/40* (2006.01)
  *G06F 13/38* (2006.01)

(52) U.S. Cl.
  CPC .......... *G06F 3/0635* (2013.01); *G06F 3/0659* (2013.01); *G06F 3/0689* (2013.01); *G06F 13/385* (2013.01); *G06F 13/4022* (2013.01); *G06F 13/42* (2013.01); *G06F 2213/0026* (2013.01)

(58) Field of Classification Search
  CPC .......... G06F 3/0689; G06F 2213/0026; G06F 13/385; G06F 13/42; G06F 13/4022
  USPC ........................................................ 709/213
  See application file for complete search history.

(56) References Cited

U.S. PATENT DOCUMENTS

| | | | |
|---|---|---|---|
| 10,230,544 | B1 * | 3/2019 | McDowell .............. H04L 45/64 |
| 2011/0264833 | A1 | 10/2011 | Zhang et al. |
| 2016/0085718 | A1 | 3/2016 | Huang |
| 2016/0132237 | A1 | 5/2016 | Jeong et al. |
| 2016/0162438 | A1 | 6/2016 | Hussain et al. |
| 2016/0364346 | A1 | 12/2016 | Yang et al. |

FOREIGN PATENT DOCUMENTS

| | | |
|---|---|---|
| CN | 104038550 A | 9/2014 |
| CN | 104111907 A | 10/2014 |
| CN | 104951252 A | 9/2015 |
| CN | 105245576 A | 1/2016 |
| CN | 105589661 A | 5/2016 |
| EP | 3147792 A1 | 3/2017 |

* cited by examiner

PACKET FORWARDING METHOD, DEVICE, AND SYSTEM IN NON-VOLATILE MEMORY EXPRESS OVER FABRIC

CROSS-REFERENCE TO RELATED APPLICATIONS

This application is a continuation of U.S. patent application Ser. No. 15/961,851, filed on Apr. 24, 2018, now U.S. Pat. No. 10,585,628, which is a continuation of International Application No. PCT/CN2016/112630, filed on Dec. 28, 2016. Both of the aforementioned applications are hereby incorporated by reference in their entireties.

TECHNICAL FIELD

The present disclosure relates to the field of information technologies, and in particular, to a packet forwarding method, device, and system in non-volatile memory express (NVMe) over fabric.

BACKGROUND

NVMe specifies a transmission mechanism between an NVMe device and a host that are connected by using a Peripheral Component Interconnect Express (PCIe) bus.

After a published NVMe standard of a PCIe architecture gains a huge success in the industry, the industry immediately expects to expand the NVMe standard to the data center field. However, due to disadvantages (such as scalability and long-distance connections) of the PCIe protocol in the data center field, the industry is driving running of the NVMe protocol on a network, so as to provide more flexible and more extensive applications. The network on which the NVMe protocol runs includes but is not limited to iWarp, remote direct memory access over Converged Ethernet (ROCE), Infiniband, Fiber Channel (FC), Omni-Path, and the like. In the industry, an architecture that is of the NVMe protocol and that runs on a network, such as iWarp, ROCE, Infiniband, FC, or Omni-Path, is referred to as NVMe over Fabric (or NVMe-oF).

In the NVMe over Fabric architecture, a host is responsible for initiating data read/write, and a target storage device is responsible for receiving and executing a command sent by the host. There may be multiple paths between the host and the target storage device to transmit the command and data. The multiple paths may be managed and controlled by means of integrating multipath software into an operating system of the host.

To integrate the multipath software into the operating system of the host, corresponding multipath software needs to be developed on the host for different operating system versions of the host. An implementation is complex.

SUMMARY

This application provides a packet forwarding method, device, and system in NVMe over Fabric, so as to simplify an implementation of multipath control in the NVMe over Fabric.

According to an aspect, this application provides a forwarding and processing device in NVMe over Fabric, where the forwarding and processing device includes a processor, a bus port, and at least two network ports, where the bus port is connected to a Peripheral Component Interconnect Express PCIe bus, the at least two network ports are separately connected to a network, and the processor is configured to:

receive, by using the bus port, a first packet sent by a control device in the NVMe over Fabric, and obtain an input/output command or a management command, where the input/output command or the management command complies with the NVMe protocol, is included in the first packet, and includes an identity of a target non-volatile memory that needs to be accessed;

generate a second packet according to the input/output command or the management command, where the input/output command or the management command complies with the NVMe protocol and is included in the first packet, and the second packet is a packet for executing the input/output command or the management command;

obtain, according to the identity of the target non-volatile memory, multiple network ports that are in the at least two network ports and that can reach the target non-volatile memory, and select, from the multiple network ports, a network port for forwarding the second packet; and encapsulate the second packet into a packet that meets an NVMe over Fabric forwarding requirement, and send the encapsulated second packet by using the selected network port.

According to the foregoing forwarding and processing device, multipath software does not need to be installed on the control device in the NVMe over Fabric, thereby eliminating complexity caused by a need of matching various possible operating systems during installation of the multipath software on the control device. In addition, only a generic NVMe standard driver needs to be installed on the control device to deliver the NVMe input/output command and management command, and adaptive adjustment does not need to be performed on an operating system according to a specific forwarding requirement of an NVMe over Fabric network, thereby reducing maintenance costs of the control device.

Optionally, the network port is connected to a target storage device by using a network such as iWarp, ROCE, Infiniband, FC, or Omni-Path.

Optionally, the network port is connected to the target storage device by using at least one switch.

Optionally, the input/output command is used to write data to the target non-volatile memory or read data from the target non-volatile memory. The management command includes but is not limited to: reading device information of the target non-volatile memory, adding or deleting the target non-volatile memory, and the like.

Optionally, the input/output command or the management command that complies with the NVMe protocol may be a field or a payload that complies with the NVMe protocol.

In a possible design, the bus port supports the PCIe protocol; and the bus port is configured to: receive the first packet sent by the control device, obtain the input/output command or the management command that complies with the NVMe protocol and that is included in the first packet, and send, to the processor, the obtained input/output command or management command that complies with the NVMe protocol and that is in the first packet; or the bus port is configured to: receive the first packet sent by the control device, and send the first packet to the processor, where the processor obtains the input/output command or the management command that complies with the NVMe protocol and that is included in the first packet.

In a possible design, the processor modifies an address to another address to generate the second packet when the first packet includes a data write command, where the address is carried in the data write command and is of storage space, of data that needs to be stored, in the control device, and the another address is of storage space that is in the forwarding and processing device and in which the data that needs to be stored is stored; or the processor modifies an address to another address to generate the second packet when the first packet includes the management command and the management command requires management data to be written to the target non-volatile memory, where the address is carried in the management command and is of storage space that is of the management data and that is in the control device, and the another address is of storage space in which the management data is stored and that is in the forwarding and processing device.

Optionally, the forwarding and processing device further includes a primary storage. The processor obtains, from the control device according to the address, included in the data write command, of the storage space that is in the control device and in which the data that needs to be stored is stored, the data that needs to be stored; stores the data into the primary storage; and uses an address of storage space that is in the primary storage and at which the data that needs to be stored is stored as the address, included in the second packet, of the storage space that is in the forwarding and processing device and in which the data that needs to be stored is stored.

Optionally, the primary storage may be implemented by using an independent field programmable gate array (FPGA) chip.

Optionally, the data that needs to be stored and that is obtained by the processor from the control device may be transmitted by means of remote direct memory access (RDMA) or direct memory access (DMA).

In a possible design, the processor modifies an address to another address to generate the second packet when the first packet includes a data read command, where the address is carried in the data read command and is of storage space, in the control device, into which data that needs to be read is to be written, and the another address is of storage space that is in the forwarding and processing device and in which the data that needs to be read is stored; or the processor modifies an address to another address to generate the second packet when the first packet includes the management command and the management command requires management data to be read, where the address is carried in the management command and is of storage space into which the management data is to be written and that is in the control device, and the another address is of storage space in which the management data is stored and that is in the forwarding and processing device.

Optionally, when the forwarding and processing device receives a packet returned by the target storage device, the processor decapsulates the received packet, that is, decapsulates, according to a specific network protocol used between the forwarding and processing device and the target storage device, the received packet returned by the target storage device, and returns obtained command information or data information to the control device.

Optionally, when the management command does not require related configuration information to be read or written, the processor may not modify the management command, but directly generate a second packet used for executing the management command. When data that needs to be read or written is directly carried in the input/output command, the processor does not need to modify an address of the data that is to be read or written, but directly generate a second packet used for executing the input/output command that complies with the NVMe protocol and that is in the first packet.

Optionally, the processor may obtain, according to the identity of the target non-volatile memory, all or some of the network ports that can reach the target non-volatile memory.

Optionally, the processor may select, according to a preset selection policy and from the network ports that can reach the target non-volatile memory, the network port for forwarding the second packet. The selection policy includes but is not limited to an active/standby selection policy, a load sharing policy, a priority policy, and a quality of service (QoS) policy.

The active/standby selection policy includes: selecting, by default, a network port in a preset active path as a network port for sending; when the active path fails, selecting a network port in a standby path as a network port for sending; and after the active path recovers, selecting a network port in the active path as a network port for sending.

The load sharing policy includes: selecting at least two paths from at least two paths, and using each network port in the at least two paths as a network port for sending.

The priority policy includes: if a packet includes priority information, selecting, according to the priority information included in the packet, a network port in a path corresponding to a priority in the packet as a network port for sending. A path with a high priority provides high transmission reliability and/or efficiency.

The QoS policy includes: if a packet includes QoS information, selecting, according to the QoS information included in the packet, a network port in a path corresponding to a QoS class in the packet as a network port for sending. A path with high QoS provides high transmission reliability and/or efficiency.

In a possible design, the encapsulating the second packet into a packet that meets an NVMe over Fabric forwarding requirement includes:

encapsulating, according to a network protocol used between the forwarding and processing device and the target storage device, the second packet into a packet that meets a requirement of the network protocol used between the forwarding and processing device and the target storage device.

Optionally, the processor is further configured to: manage non-volatile memory discovery, link establishment, link disconnection, and the like in the target storage device, and provide an in-band or out-of-band management function interface and the like.

Optionally, when the processor performs in-band management, the processor receives, by using the bus port or another port, the management command sent by the control device, and implements configuration and management according to the received management command, or when the processor performs out-of-band management, the processor receives, by using a baseboard management controller (BMC), the management command sent by the control device.

Optionally, the management command delivered by the control device includes but is not limited to: initialization and interface configuration of the forwarding and processing device, and management and authentication of non-volatile memory discovery, link establishment, and link disconnection in the target storage device.

According to another aspect, this application provides a system in NVMe over Fabric, where the system includes a control device and a forwarding and processing device, and the forwarding and processing device and the control device are connected by using a Peripheral Component Interconnect Express (PCIe) bus, where the control device is configured to send a first packet to the forwarding and processing device by using the PCIe bus, where the first packet includes an input/output command or a management command, and the input/output command or the management command complies with the NVMe protocol and includes an identity of a target non-volatile memory that needs to be accessed; and the forwarding and processing device is configured to: receive the first packet; obtain the identity of the target non-volatile memory and obtain the input/output command or the management command, where the input/output command or the management command complies with the NVMe protocol and is included in the first packet; generate a second packet according to the input/output command or the management command that complies with the NVMe protocol, where the second packet is a packet for executing the input/output command or the management command; obtain, according to the identity of the target non-volatile memory, multiple network ports that are in at least two network ports and that can reach the target non-volatile memory; select, from the multiple network ports, a network port for forwarding the second packet; encapsulate the second packet into a packet that meets an NVMe over Fabric forwarding requirement; and send the encapsulated second packet by using the selected network port.

According to the foregoing system, multipath software does not need to be installed on the control device in the NVMe over Fabric, thereby eliminating complexity caused by a need of matching various possible operating systems during installation of the multipath software on the control device. In addition, only a generic NVMe standard driver needs to be installed on the control device to deliver the NVMe input/output command and management command, and adaptive adjustment does not need to be performed on an operating system according to a specific forwarding requirement of an NVMe over Fabric network, thereby reducing maintenance costs of the control device.

In a possible design, the forwarding and processing device includes a processor, a bus port, and the at least two network ports, where the bus port is connected to the PCIe bus, the at least two network ports are connected to a network, and the processor is configured to:

receive, by using the bus port, the first packet sent by the control device, and obtain the input/output command or the management command that complies with the NVMe protocol and that is included in the first packet;

generate the second packet according to the input/output command or the management command, where the input/output command or the management command complies with the NVMe protocol and is included in the first packet, and the second packet is the packet for executing the input/output command or the management command;

obtain, according to the identity of the target non-volatile memory, the network ports that can reach the target non-volatile memory, and select, from the network ports that can reach the target non-volatile memory, the network port for forwarding the second packet; and encapsulate the second packet into the packet that meets the NVMe over Fabric forwarding requirement, and send the encapsulated second packet by using the selected network port.

Optionally, the network port is connected to a target storage device by using a network such as iWarp, ROCE, Infiniband, FC, or Omni-Path.

Optionally, the network port is connected to the target storage device by using at least one switch.

Optionally, the input/output command is used to write data to the target non-volatile memory or read data from the target non-volatile memory. The management command includes but is not limited to: reading device information of the target non-volatile memory, adding or deleting the target non-volatile memory, and the like.

Optionally, the input/output command or the management command that complies with the NVMe protocol may be a field or a payload that complies with the NVMe protocol.

In a possible design, the bus port supports the Peripheral Component Interconnect Express (PCIe) protocol; and the bus port is configured to: receive the first packet sent by the control device, obtain the input/output command or the management command that complies with the NVMe protocol and that is included in the first packet, and send, to the processor, the obtained input/output command or management command that complies with the NVMe protocol and that is in the first packet; or the bus port is configured to: receive the first packet sent by the control device, and send the first packet to the processor, where the processor obtains the input/output command or the management command that complies with the NVMe protocol and that is included in the first packet.

In a possible design, the processor modifies an address to another address to generate the second packet when the first packet includes a data write command, where the address is carried in the data write command and is of storage space, of data that needs to be stored, in the control device, and the another address is of storage space that is in the forwarding and processing device and in which the data that needs to be stored is stored; or the processor modifies an address to another address to generate the second packet when the first packet includes the management command and the management command requires management data to be written to the target non-volatile memory, where the address is carried in the management command and is of storage space that is of the management data and that is in the control device, and the another address is of storage space in which the management data is stored and that is in the forwarding and processing device.

Optionally, the forwarding and processing device further includes a primary storage. The processor obtains, from the control device according to the address, included in the data write command, of the storage space that is in the control device and in which the data that needs to be stored is stored, the data that needs to be stored; stores the data into the primary storage; and uses an address of storage space that is in the primary storage and at which the data that needs to be stored is stored as the address, included in the second packet, of the storage space that is in the forwarding and processing device and in which the data that needs to be stored is stored.

Optionally, the primary storage may be implemented by using an independent FPGA chip.

Optionally, the data that needs to be stored and that is obtained by the processor from the control device may be transmitted by means of RDMA or DMA.

In a possible design, the processor modifies an address to another address to generate the second packet when the first packet includes a data read command, where the address is carried in the data read command and is of storage space, in the control device, into which data that needs to be read is to be written, and the another address is of storage space that is in the forwarding and processing device and in which the data that needs to be read is stored; or the processor modifies an address to another address to generate the second packet when the first packet includes the management command and the management command requires management data to be read, where the address is carried in the management command and is of storage space into which the management data is to be written and that is in the control device, and the another address is of storage space in which the management data is stored and that is in the forwarding and processing device.

Optionally, when the forwarding and processing device receives a packet returned by the target storage device, the processor decapsulates the received packet, that is, decapsulates, according to a specific network protocol used between the forwarding and processing device and the target storage device, the received packet returned by the target storage device, and returns obtained command information or data information to the control device.

Optionally, when the management command does not require related configuration information to be read or written, the processor may not modify the management command, but directly generate a second packet used for executing the management command. When data that needs to be read or written is directly carried in the input/output command, the processor does not need to modify an address of the data that is to be read or written, but directly generate a second packet used for executing the input/output command that complies with the NVMe protocol and that is in the first packet.

Optionally, the processor may obtain, according to the identity of the target non-volatile memory, all or some of the network ports that can reach the target non-volatile memory.

Optionally, the processor may select, according to a preset selection policy and from the network ports that can reach the target non-volatile memory, the network port for forwarding the second packet. The selection policy includes but is not limited to an active/standby selection policy, a load sharing policy, a priority policy, and a QoS policy.

In a possible design, the encapsulating the second packet into a packet that meets an NVMe over Fabric forwarding requirement includes:

encapsulating, according to a network protocol used between the forwarding and processing device and the target storage device, the second packet into a packet that meets a requirement of the network protocol used between the forwarding and processing device and the target storage device.

Optionally, the processor is further configured to: manage non-volatile memory discovery, link establishment, link disconnection, and the like in the target storage device, and provide an in-band or out-of-band management function interface and the like.

Optionally, when the processor performs in-band management, the processor receives, by using the bus port or another port, the management command sent by the control device, and implements configuration and management according to the received management command, or when the processor performs out-of-band management, the processor receives, by using a BMC, the management command sent by the control device.

Optionally, the management command delivered by the control device includes but is not limited to: initialization and interface configuration of the forwarding and processing device, and management and authentication of non-volatile memory discovery, link establishment, and link disconnection in the target storage device.

According to still another aspect, this application provides a packet forwarding method, where the method is applied to packet forwarding in NVMe over Fabric, the NVMe over Fabric includes a forwarding and processing device and a control device, and the method includes:

receiving, by the forwarding and processing device, a first packet sent by the control device, and obtaining an input/output command or a management command that complies with the NVMe protocol and that is included in the first packet, where the input/output command or the management command includes an identity of a target non-volatile memory that needs to be accessed;

generating a second packet according to the input/output command or the management command, where the input/output command or the management command complies with the NVMe protocol and is included in the first packet, and the second packet is a packet for executing the input/output command or the management command;

obtaining, according to the identity of the target non-volatile memory, multiple network ports that are in at least two network ports and that can reach the target non-volatile memory, and selecting, from the multiple network ports, a network port for forwarding the second packet; and encapsulating the second packet into a packet that meets an NVMe over Fabric forwarding requirement, and sending the encapsulated second packet by using the selected network port.

According to the foregoing method, multipath software does not need to be installed on the control device in the NVMe over Fabric, thereby eliminating complexity caused by a need of matching various possible operating systems during installation of the multipath software on the control device. In addition, only a generic NVMe standard driver needs to be installed on the control device to deliver the NVMe input/output command and management command, and adaptive adjustment does not need to be performed on an operating system according to a specific forwarding requirement of an NVMe over Fabric network, thereby reducing maintenance costs of the control device.

In a possible design, the obtaining an input/output command or a management command that complies with the NVMe protocol and that is included in the first packet includes:

receiving, by the forwarding and processing device by using a port that supports the Peripheral Component Interconnect Express PCIe protocol, the first packet sent by the control device by using a PCIe bus, and obtaining the input/output command or the management command that complies with the NVMe protocol and that is included in the first packet.

Optionally, the network port is connected to a target storage device by using a network such as iWarp, ROCE, Infiniband, FC, or Omni-Path.

Optionally, the network port is connected to the target storage device by using at least one switch.

Optionally, the input/output command is used to write data to the target non-volatile memory or read data from the target non-volatile memory. The management command includes but is not limited to: reading device information of the target non-volatile memory, adding or deleting the target non-volatile memory, and the like.

Optionally, the input/output command or the management command that complies with the NVMe protocol may be a field or a payload that complies with the NVMe protocol.

In a possible design, the generating a second packet according to the input/output command or the management command that complies with the NVMe protocol and that is included in the first packet includes:

modifying, by a processor, an address to another address to generate the second packet when the first packet includes a data write command, where the address is carried in the data write command and is of storage space, of data that needs to be stored, in the control device, and the another address is of storage space that is in the forwarding and processing device and in which the data that needs to be stored is stored; or modifying, by the processor, an address to another address to generate the second packet when the first packet includes the management command and the management command requires management data to be written to the target non-volatile memory, where the address is carried in the management command and is of storage space that is of the management data and that is in the control device, and the another address is of storage space in which the management data is stored and that is in the forwarding and processing device.

In a possible design, the generating a second packet according to the input/output command or the management command that complies with the NVMe protocol and that is in the first packet includes:

modifying, by the processor, an address to another address to generate the second packet when the first packet includes a data read command, where the address is carried in the data read command and is of storage space, in the control device, into which data that needs to be read is to be written, and the another address is of storage space that is in the forwarding and processing device and in which the data that needs to be read is stored; or modifying, by the processor, an address to another address to generate the second packet when the first packet includes the management command and the management command requires management data to be read, where the address is carried in the management command and is of storage space into which the management data is to be written and that is in the control device, and the another address is of storage space in which the management data is stored and that is in the forwarding and processing device.

Optionally, when the forwarding and processing device receives a packet returned by the target storage device, the processor decapsulates the received packet, that is, decapsulates, according to a specific network protocol used between the forwarding and processing device and the target storage device, the received packet returned by the target storage device, and returns obtained command information or data information to the control device.

Optionally, when the management command does not require related configuration information to be read or written, the processor may not modify the management command, but directly generate a second packet used for executing the management command. When data that needs to be read or written is directly carried in the input/output command, the processor does not need to modify an address of the data that is to be read or written, but directly generate a second packet used for executing the input/output command that complies with the NVMe protocol and that is in the first packet.

Optionally, the processor may obtain, according to the identity of the target non-volatile memory, all or some of the network ports that can reach the target non-volatile memory.

Optionally, the processor may select, according to a preset selection policy and from the network ports that can reach the target non-volatile memory, the network port for forwarding the second packet. The selection policy includes but is not limited to an active/standby selection policy, a load sharing policy, a priority policy, and a QoS policy.

In a possible design, the encapsulating the second packet into a packet that meets an NVMe over Fabric forwarding requirement includes:

encapsulating, according to a network protocol used between the forwarding and processing device and the target storage device, the second packet into a packet that meets a requirement of the network protocol used between the forwarding and processing device and the target storage device.

Optionally, the forwarding and processing device is further configured to: manage non-volatile memory discovery, link establishment, link disconnection, and the like in the target storage device, and provide an in-band or out-of-band management function interface and the like.

Optionally, when the forwarding and processing device performs in-band management, the forwarding and processing device receives, by using the bus port or another port, the management command sent by the control device, and implements configuration and management according to the received management command, or when the forwarding and processing device performs out-of-band management, the processor receives, by using a BMC, the management command sent by the control device.

Optionally, the management command delivered by the control device includes but is not limited to: initialization and interface configuration of the forwarding and processing device, and management and authentication of non-volatile memory discovery, link establishment, and link disconnection in the target storage device.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The terms "first" and "second" in this application are merely intended for a purpose of description, and shall not be understood as an indication or implication of relative importance or implicit indication of a quantity of indicated technical features.

In an NVMe over Fabric architecture, to avoid a single point of failure on a target, reliability is improved by means of redundancy backup. In addition, higher performance can be achieved by using redundant paths. An operating system of a host determines that each path is connected to one hard disk that actually exists, but actually, multiple paths reach a same hard disk. When one of the multiple paths fails, the host may perform transmission by using another path, so as to improve system reliability. A path failure may be caused by cable damage, a switch fault, a redundant array of independent disks (RAID) controller fault of a target storage device, or the like.

Figure 1:
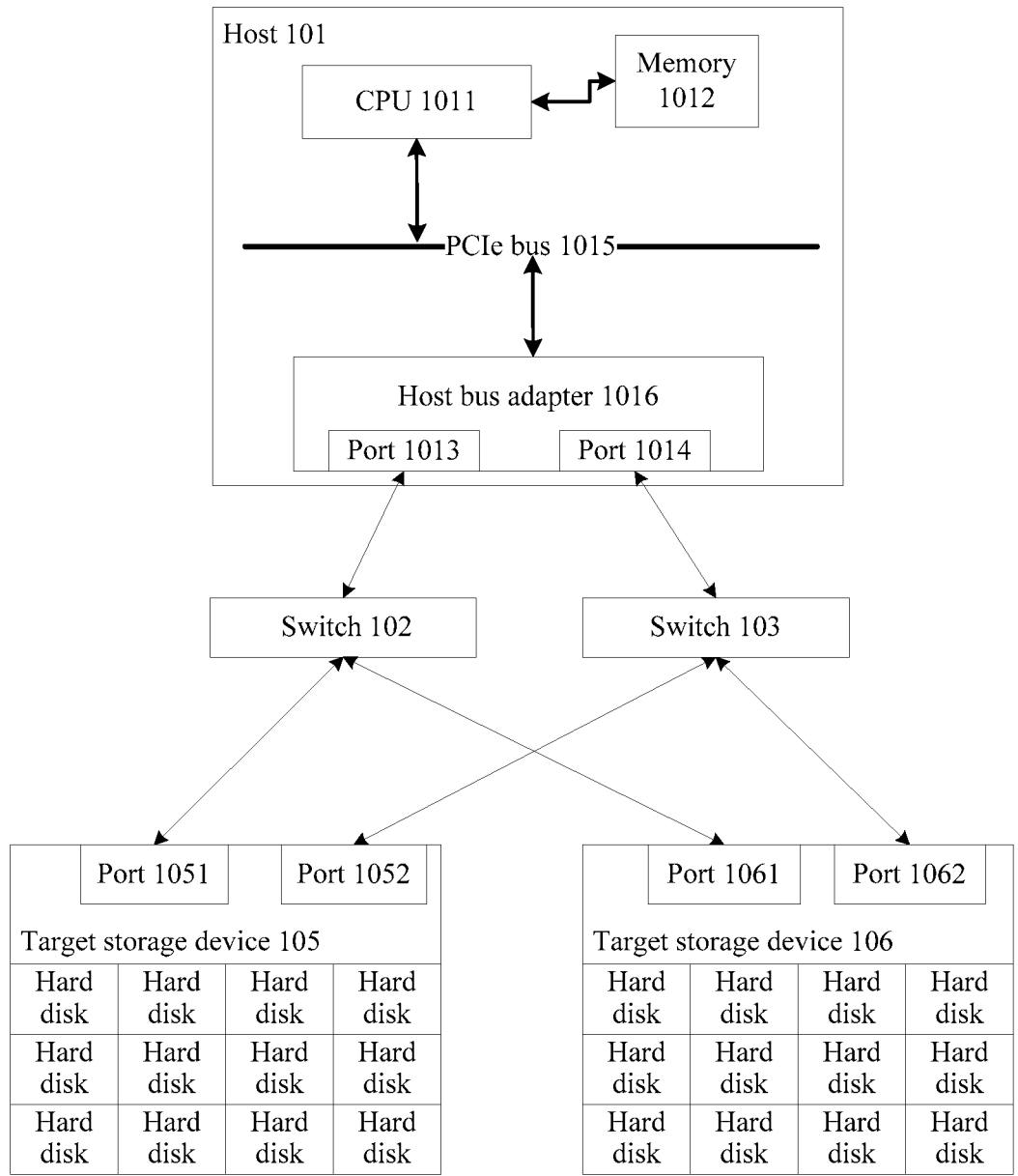
FIG. 1 is a schematic structural diagram of a system in an NVMe over Fabric architecture.

FIG. 1 is a schematic structural diagram of a system in a conventional NVMe over Fabric architecture. The system includes a host 101, a switch 102, a switch 103, a target storage device 105, and a target storage device 106. The host 101 is connected to the target storage device 105 and the target storage device 106 by using the switch 102 and the switch 103 respectively. In FIG. 1, description is made by using an example in which the system includes one host, two switches, and two target storage devices, and the host and all the target storage devices each include two ports.

The host 101 includes a central processing unit (CPU) 1011, a memory 1012, a host bus adapter (HBA) 1016, and a PCIe bus 1015. The CPU 1011 and the HBA 1016 are connected to each other by using the PCIe bus 1015. The HBA 1016 includes a port 1013 and a port 1014 that are connected to the switch 102 and the switch 103 respectively.

The target storage device 105 and the target storage device 106 each include one or more non-volatile memories. In FIG. 1, a non-volatile memory is represented by a hard disk. The non-volatile memory may be a solid state disk (SSD) or a hard disk drive (HDD). The target storage device 105 includes a port 1051 and a port 1052. The port 1051 and the port 1052 are connected to the switch 102 and the switch 103 respectively. The target storage device 106 includes a port 1061 and a port 1062 that are connected to the switch 102 and the switch 103 respectively.

In FIG. 1, the host 101 and the target storage device 105 are connected by using two paths. One of the paths is "the port 1013↔the switch 102↔the port 1051". The other path is "the port 1014↔the switch 103↔the port 1052". When one of the paths fails, the host 101 and the target storage device 105 may communicate with each other by using the other path.

There may be at least two paths between the host and the target storage device. When all of the at least two paths are normal, only one or some active paths of the paths may be used to transmit data, and other paths are standby paths. Alternatively, all or some of the paths may be used to transmit data by means of load sharing.

When the host 101 is connected to a same hard disk in the target storage device 105 by using two paths, an operating system running on the host 101 determines that the host 101 is connected to two logical hard disks in the target storage device by using the two paths. To make the operating system on the host 101 correctly use the two logical hard disks, multipath software needs to be deployed on the host 101, so that the operating system on the host 101 uses the two different logical hard disks as one physical hard disk, so as to avoid a problem that a connection exception or data overwriting possibly occurs. However, deploying the multipath software on the host 101 causes a software matching problem among different operating systems, and also causes a compatibility problem between the multipath software and existing software of the host 101.

To resolve the foregoing problems, an embodiment of the present disclosure provides a forwarding and processing device. The forwarding and processing device can implement path selection when a host accesses a target storage device in NVMe over Fabric, so that the host can access or control a storage resource by means of NVMe over Fabric merely by loading a generic NVMe protocol driver.

Figure 2:
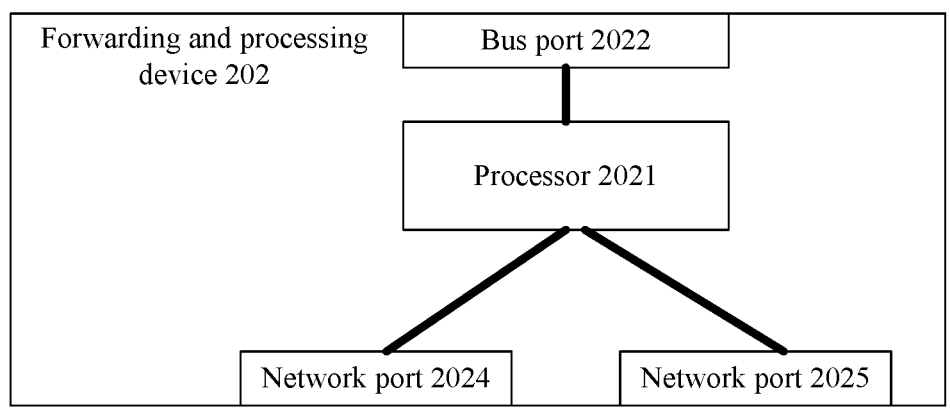
FIG. 2 is a schematic structural diagram of a forwarding and processing device 202 according to an embodiment of the present disclosure.

Referring to FIG. 2, FIG. 2 is a schematic structural diagram of a forwarding and processing device 202 according to an embodiment of the present disclosure. The forwarding and processing device 202 includes a processor 2021, a bus port 2022, a network port 2024, and a network port 2025. The processor 2021 is connected to the bus port 2022. The bus port 2022 is connected, by using a PCIe bus, to a CPU of a host that is in NVMe over Fabric and that serves as a control device, and receives a packet sent by the CPU of the host, or sends, to the CPU of the host, a packet sent by the forwarding and processing device to the host. The network port 2024 and the network port 2025 are connected to a target storage device by using a network, and are configured to forward a packet that is sent to the target storage device by the processor 2021, or receive a packet that is sent to the forwarding and processing device 202 by the target storage device. The processor 2021 receives, by using the bus port 2022, a first packet sent by the CPU of the host, where the first packet includes an input/output command or a management command that complies with the NVMe protocol. The processor 2021 generates, according to the input/output command or the management command that complies with the NVMe protocol and that is included in the first packet, a second packet for executing the input/output command or the management command. That is, when the first packet includes the input/output command, the processor 2021 generates, according to the input/output command included in the first packet, the second packet for executing the input/output command, or when the first packet includes the management command, the processor 2021 generates, according to the management command included in the first packet, the second packet for executing the management command. The input/output command that complies with the NVMe protocol may be a data read command that complies with the NVMe protocol, a data write command that complies with the NVMe protocol, or the like.

The processor 2021 is further configured to select a path for sending the second packet. That the processor 2021 selects the path for sending the second packet may be implemented by selecting a network port for sending the second packet. In addition, the processor 2021 is further configured to encapsulate the second packet into a packet in a form that meets an NVMe over Fabric network forwarding requirement, and send the encapsulated second packet. That is, the processor 2021 selects a network port from the network port 2024 and the network port 2025, encapsulates the second packet into the packet in the form that meets the NVMe over Fabric network forwarding requirement, and sends the encapsulated second packet by using the selected network port.

Figure 3:
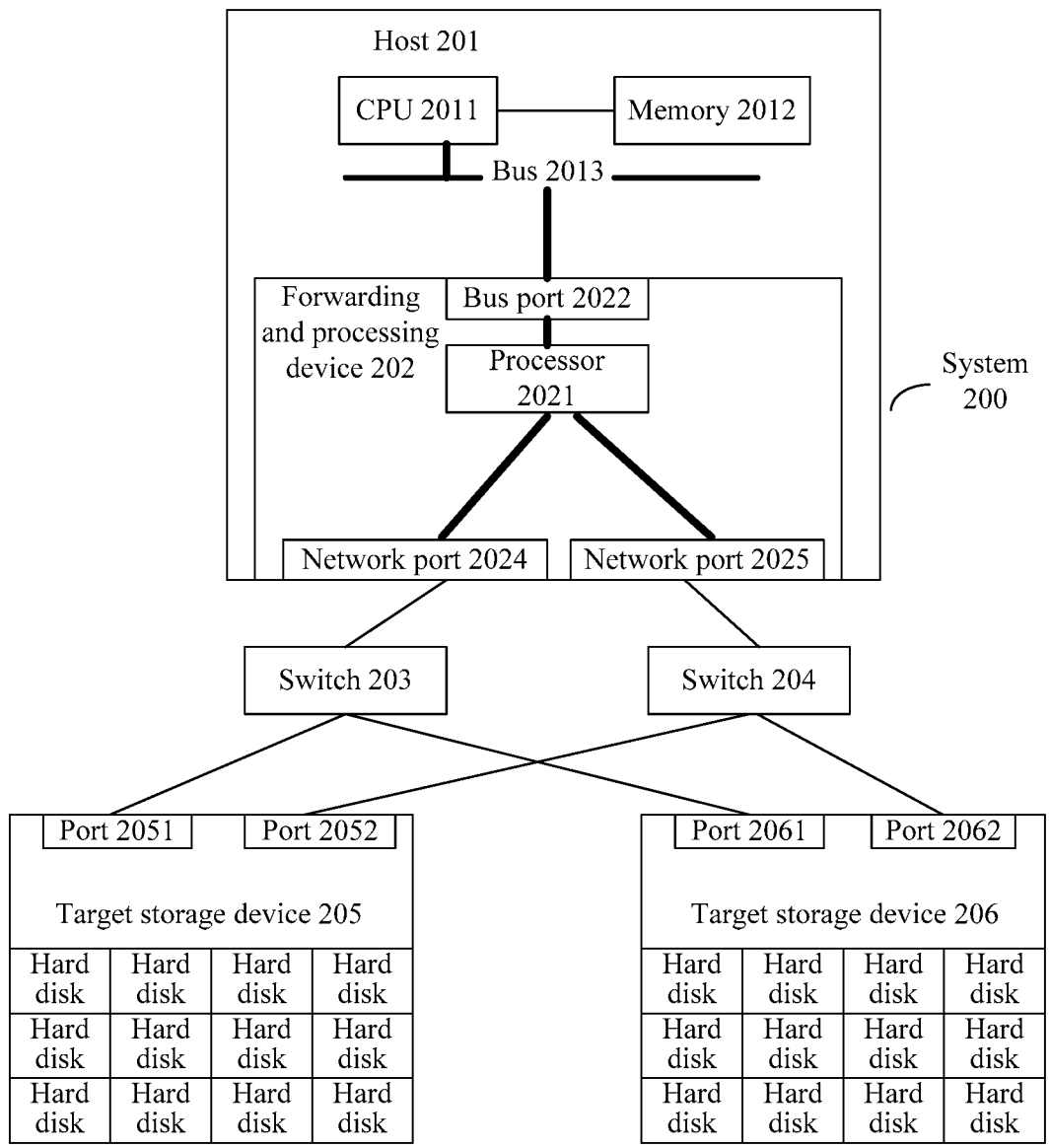
FIG. 3 is a schematic structural diagram of a system 200 according to an embodiment of the present disclosure.

The following describes in detail an implementation of the forwarding and processing device 202 provided in this embodiment of the present disclosure by using an example in which the forwarding and processing device 202 is connected to one host and communicates with two target storage devices by using two switches. Referring to FIG. 3, FIG. 3 is a schematic structural diagram of a system 200 for implementing multipath control according to an embodiment of the present disclosure. In FIG. 3, the system 200 includes a host 201, a switch 203, a switch 204, a target storage device 205, and a target storage device 206. The host 201 includes a CPU 2011, a memory 2012, a forwarding and processing device 202, and a bus 2013. The CPU 2011 and the forwarding and processing device 202 are connected to each other by using the bus 2013. The target storage device 205 and the target storage device 206 each include at least one hard disk. The hard disks may be storage media such as SSDs or HDDs. The target storage device 205 includes a port 2051 and a port 2052. The target storage device 206 includes a port 2061 and a port 2062.

A bus port 2022 in the forwarding and processing device 202 is connected to the bus in the host 201, to implement communication between the forwarding and processing device 202 and the host 201. A network port 2024 in the forwarding and processing device 202 is connected to the switch 203, and is connected, by using the switch 203, to both the target storage device 205 and the target storage device 206, that is, connected to the port 2051 in the target storage device 205 to implement communication between the forwarding and processing device 202 and the target storage device 205, and connected to the port 2061 in the target storage device 206 to implement communication between the forwarding and processing device 202 and the target storage device 206. A network port 2025 in the forwarding and processing device 202 is connected to the switch 204, and is connected, by using the switch 204, to both the target storage device 205 and the target storage device 206, that is, connected to the port 2052 in the target storage device 205 to implement communication between the forwarding and processing device 202 and the target storage device 205, and connected to the port 2062 in the target storage device 206 to implement communication between the forwarding and processing device 202 and the target storage device 206.

It should be noted that, in FIG. 3, description is made by using an example in which the forwarding and processing device 202 is connected to target storage devices by using two network ports, that is, the network port 2024 and the network port 2025. In a specific implementation, the forwarding and processing device 202 may be connected to the target storage devices by using at least two network ports.

Connection and communication may be implemented between the forwarding and processing device 202 and the target storage devices (such as the target storage device 205 and the target storage device 206) by using a fabric network, such as an iWarp, ROCE, Infiniband, FC, or Omni-Path network. The switch 203 and the switch 204 are switches in an NVMe over Fabric architecture. It can be understood that, in FIG. 3, description is made merely by using two switches (the switch 203 and the switch 204) as an example, and in a specific implementation, network communication between the forwarding and processing device 202 and the target storage devices may be implemented by at least one or two switches.

The bus port 2022 in the forwarding and processing device 202 is a PCIe bus port. The bus 2013 in the host 201 is a PCIe bus. The bus port 2022 communicates with the bus 2013 based on the PCIe protocol.

In this embodiment of the present disclosure, the bus port 2022 receives, by using the bus 2013, a first packet sent by the host 201. The first packet is a packet sent based on the PCIe protocol, and the first packet includes an input/output command or a management command that complies with the NVMe protocol. The input/output command or the management command that complies with the NVMe protocol includes an identity of a target hard disk that is in a target storage device (such as the target storage device 205 or the target storage device 206) and that needs to be accessed. The input/output command is used to write data into the target hard disk or read data from the target hard disk. The management command includes but is not limited to: reading device information (such as a serial number and temperature) of the target hard disk, adding or deleting the target hard disk, and the like. Optionally, the input/output command or the management command that complies with the NVMe protocol may be a field or a payload that complies with the NVMe protocol.

After receiving the first packet, the bus port 2022 obtains the input/output command or the management command that complies with the NVMe protocol and that is included in the first packet, and sends, to a processor 2021, the obtained input/output command or the management command that complies with the NVMe protocol. Further, the first packet is a PCIe packet, and the bus port 2022 obtains the input/output command or the management command that complies with the NVMe protocol and that is included in the first packet. For example, the bus port 2022 may obtain, according to the PCIe protocol, content that is of a field or a payload related to the NVMe protocol and that is included in the first packet used as the PCIe packet, so as to obtain the input/output command or the management command that complies with the NVMe protocol and that is included in the first packet.

The processor 2021 generates a second packet according to the input/output command or the management command that is based on the NVMe protocol and that is in the received first packet. The second packet is a packet for executing the input/output command or the management command that is included in the first packet.

In an implementation, that the processor 2021 generates the second packet may be implemented in the following manner: The processor 2021 generates, according to the NVMe protocol and according to the input/output command or the management command that complies with the NVMe protocol and that is included in the received first packet, a packet that is sent by the forwarding and processing device 202 used as a host in NVMe over Fabric and that is for executing the input/output command or the management command that complies with the NVMe protocol and that is included in the first packet. For example, the processor 2021 generates, according to a requirement of the NVMe protocol and according to the input/output command that complies with the NVMe protocol and that is included in the received first packet, a packet that is sent by the forwarding and processing device 202 used as a data transmission device or a data receiving device and that is for executing the input/output command that complies with the NVMe protocol and that is included in the first packet, that is, generates the second packet. Alternatively, the processor 2021 generates, according to a requirement of the NVMe protocol and according to the management command that complies with the NVMe protocol and that is included in the received first packet, a packet that is sent by the forwarding and processing device 202 used as a device sending the management command and that is for executing the management command that complies with the NVMe protocol and that is included in the first packet, that is, generates the second packet.

In addition, the processor 2021 further selects, according to the identity of the target hard disk, a network port for sending the second packet, encapsulates the second packet into a packet that meets an NVMe over Fabric forwarding requirement, and sends the encapsulated second packet by using the selected network port. The processor 2021 selects the network port for sending the second packet, and can send, by using the network port, the second packet through one path. Selection of the network port for the second packet can implement selection among multiple paths that can reach the target storage device.

In this way, multipath software does not need to be installed on the host 201, thereby eliminating complexity caused by a need of matching various possible operating systems during installation of the multipath software on the host 201. In addition, only a generic NVMe standard driver needs to be installed on the host 201 to deliver the NVMe input/output command and management command, and adaptive adjustment does not need to be performed on an operating system according to a specific forwarding requirement of an NVMe over Fabric network, thereby reducing maintenance costs of the host 201. For the host 201, the forwarding and processing device 202 is a device that complies with an NVMe standard. A standard open-source NVMe driver may be loaded in the operating system of the host 201 to send, to the forwarding and processing device 202, the NVMe-related input/output command or management command.

Further, specific manners in which the processor 2021 generates the second packet differ depending on whether the first packet includes the input/output command or the management command. The following separately describes a manner in which the processor 2021 generates the second packet when the first packet includes a data write command, a data read command, or a management command.

When the first packet includes a data write command that complies with the NVMe protocol, the data write command carries an Scatter Gather List (SGL) and the identity of the target hard disk. The target hard disk is a hard disk to which data needs to be written according to the data write command. In this embodiment of the present disclosure, the data that needs to be written to the target hard disk is referred to as data that needs to be stored. The SGL includes a field, which may be, for example, an entry. The field includes information such as an address of storage space that is in the host 201 and in which the data that needs to be stored is stored, a length of the data that needs to be stored, and an address of storage space that is in the target hard disk and that is of the data that needs to be stored. It should be noted that the SGL may alternatively include multiple fields, for example, multiple entries. Each entry includes information such as an address of storage space that is in the host 201 and in which the data that needs to be stored is stored, a length of the data that needs to be stored, and an address of storage space that is in the target hard disk and that is of the data that needs to be stored. When the data that needs to be stored includes multiple address segments, that is, when the data that needs to be stored is discontinuous on the host 201 and exists in multiple address segments, multiple entries are required to record the data in the multiple address segments.

In this embodiment of the present disclosure, description is made by using an example in which the SGL includes one entry.

When generating the second packet, the processor 2021 modifies an address to another address to generate the second packet, where the address is carried in the data write command and is of the storage space, in the host 201, in which the data that needs to be stored is stored, and the another address is of storage space that is in the forwarding and processing device 202 and in which the data that needs to be stored is stored. That is, the second packet generated by the processor 2021 includes information such as the address of the storage space that is in the forwarding and processing device 202 and in which the data that needs to be stored is stored, the length of the data that needs to be stored, and the address of storage space that is in the target hard disk and that is of the data that needs to be stored. Further, an SGL in the second packet may include the information such as the address of the storage space that is in the forwarding and processing device 202 and in which the data that needs to be stored is stored, the length of the data that needs to be stored, and the address that is in the target hard disk and that is of the data that needs to be stored.

Figure 4:
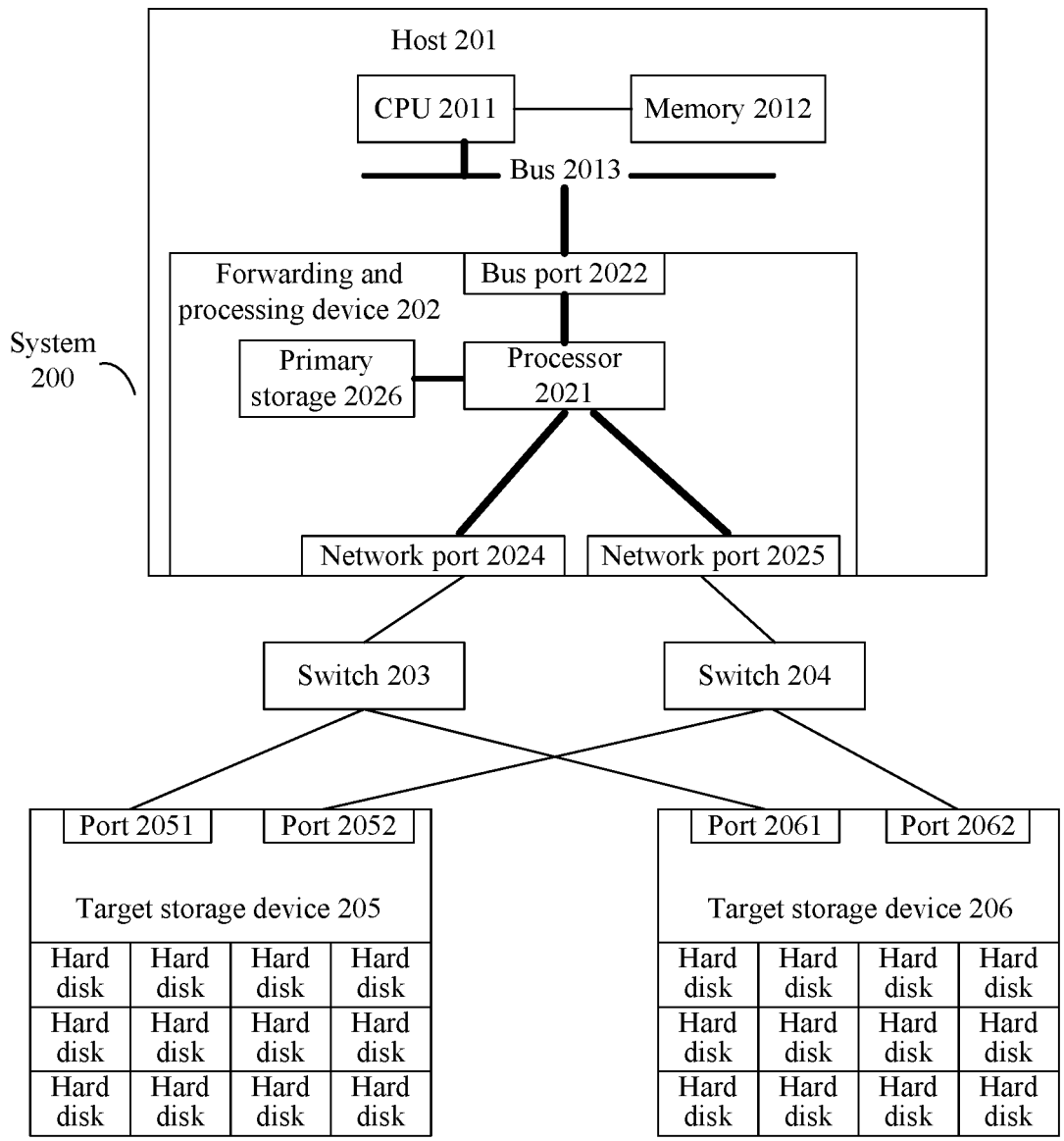
FIG. 4 is a schematic structural diagram of another implementation of a system 200 according to an embodiment of the present disclosure.

The address of the storage space that is in the forwarding and processing device 202 and in which the data that needs to be stored is stored may be an address of a primary storage in the forwarding and processing device 202. As shown in FIG. 4, the forwarding and processing device 202 further includes the primary storage 2026. The processor 2021 obtains, from the host 201 according to the address, included in the data write command, of the storage space that is in the host 201 and in which the data that needs to be stored is stored, the data that needs to be stored; stores the data into the primary storage 2026; and uses an address of storage space that is in the primary storage 2026 and at which the data that needs to be stored is stored as the address, included in the second packet, of the storage space that is in the forwarding and processing device 202 and in which the data that needs to be stored is stored.

Optionally, the data that needs to be stored and that is obtained by the processor 2021 from the host 201 may be transmitted by means of RDMA or DMA. The data that needs to be stored may also be transmitted between the forwarding and processing device 202 and the target storage device by means of RDMA or DMA.

When the first packet includes a data read command that complies with the NVMe protocol, the data read command carries an SGL and the identity of the target hard disk. The SGL includes information such as an address of storage space that is in the target hard disk and that is of data that needs to be read, a length of the data that needs to be read, and an address of storage space that is in the host 201 and into which the data that needs to be read needs to be written.

When generating the second packet, the processor 2021 modifies an address to another address, where the address is carried in the data read command and is of the storage space, in the host 201, into which the data that needs to be read needs to be written, and the another address is of storage space that is in the forwarding and processing device 202 and in which the data that needs to be read is stored, for example, an address of storage space that is in the primary storage 2026 and in which the data that needs to be read is stored. That is, the second packet generated by the processor 2021 includes information such as an address of storage space that is in the target hard disk and that is of the data that needs to be read, the length of the data that needs to be read, and the address of the storage space that is in the forwarding and processing device 202 and in which the data that needs to be read is stored. Further, an SGL in the second packet may include the information such as the address of the storage space that is in the target hard disk and that is of the data that needs to be read, the length of the data that needs to be read, and the address of the storage space that is in the forwarding and processing device 202 and in which the data that needs to be read is stored.

When the first packet includes the management command that complies with the NVMe protocol, the management command is to perform a related management operation on a specific hard disk, where an object of the management operation is a target hard disk. In addition, the management command may require related information of the target hard disk to be read or related configuration information to be sent to the target hard disk. When the management command requires the related configuration information to be sent to the target hard disk, a manner in which the processor 2021 generates the second packet is similar to a manner of generating the second packet according to the data write command. When the management command requires the related information of the target hard disk to be read, a manner in which the processor 2021 generates the second packet is similar to a manner of generating the second packet according to the data read command. Details are not described herein again.

Optionally, when the management command does not require the related configuration information to be read or written, the processor 2021 may not modify the management command, but directly generate a second packet used for executing the management command. When data that needs to be read or written is directly carried in the input/output command, the processor 2021 does not need to modify an address of the data that is to be read or written, but directly generate a second packet used for executing the input/output command that complies with the NVMe protocol and that is in the first packet.

It should be noted that, in FIG. 4, a manner in which the forwarding and processing device 202 stores data is described merely by using the primary storage as an example. In a specific implementation, the primary storage 2026 may be implemented by another storage medium, for example, a device or a chip with a storage function, such as an FPGA chip. In FIG. 4, description is made merely by using the primary storage 2026 as an example. A medium or a manner of storing data by the forwarding and processing device 202 is not limited in this embodiment of the present disclosure.

In this embodiment of the present disclosure, that the processor 2021 selects, according to the identity of the target hard disk, a network port for sending the second packet includes:

determining, by the processor 2021 according to the identity of the target hard disk, network ports that can reach the target hard disk, so as to select the network port for sending the second packet. Optionally, the processor 2021 may determine, according to the identity of the target hard disk, all or some of network ports that can reach the target hard disk. After determining all or some of the network ports that can reach the target hard disk, the processor 2021 may further select, according to a preset selection policy, the network port for sending the second packet.

The following describes a manner in which the processor 2021 selecting the network port by using an example in which two network ports reach the target hard disk. For example, in FIG. 3, a path 1 "the network port 2024↔the switch 203↔the port 2051" and a path 2 "the network port 2025↔the switch 204↔the port 2052" are paths between the forwarding and processing device 202 and a hard disk 01 in the target storage device 205. Because both of the paths can reach the hard disk 01, the processor 2021 records a correspondence between a unique identity of the hard disk 01 and the path 1 and path 2. When the target hard disk is the hard disk 01, the processor 2021 may determine, according to the unique identity of the hard disk 01, a path connected to the hard disk 01, for example, determine that paths that can reach the hard disk 01 include the path 1 and the path 2. The path 1 includes the network port 2024, and the path 2 includes the network port 2025. In this case, the processor 2021 determines that the network ports that can reach the target hard disk include the network port 2024 and the network port 2025, and then selects, according to the preset selection policy, the network port for sending the second packet, that is, selects the network port 2024 or the network port 2025.

Optionally, in this embodiment of the present disclosure, the identity of the target hard disk is a unique identity of the hard disk in the target storage device, and includes but is not limited to a serial number of the hard disk, another unique feature code, and the like.

In this embodiment of the present disclosure, the selection policy includes but is not limited to policies such as an active/standby selection policy, a load sharing policy, a priority policy, and a QoS policy.

The active/standby selection policy includes: selecting, by default, a network port in a preset active path as a network port for sending; when the active path fails, selecting a network port in a standby path as a network port for sending; and after the active path recovers, selecting a network port in the active path as a network port for sending.

The load sharing policy includes: selecting at least two paths from at least two paths, and using each network port in the at least two paths as a network port for sending.

The priority policy includes: if a packet includes priority information, selecting, according to the priority information included in the packet, a network port in a path corresponding to a priority in the packet as a network port for sending. A path with a high priority provides high transmission reliability and/or efficiency.

The QoS policy includes: if a packet includes QoS information, selecting, according to the QoS information included in the packet, a network port in a path corresponding to a QoS class in the packet as a network port for sending. A path with high QoS provides high transmission reliability and/or efficiency.

In this embodiment of the present disclosure, that the processor 2021 encapsulates the second packet into a packet that meets an NVMe over Fabric forwarding requirement includes:

encapsulating, by the processor 2021 according to a network protocol used between the forwarding and processing device 202 and the target storage device (such as the target storage device 205 or the target storage device 206), the second packet into a packet that meets a requirement of the network protocol used between the forwarding and processing device 202 and the target storage device.

The NVMe over Fabric is a general term of a connection implemented between the host and the target storage device by using a network such as iWarp, ROCE, Infiniband, FC, or Omni-Path. Therefore, transmission between the host and the target storage device is implemented by using different networks according to specific implementation cases. After generating the second packet, the processor 2021 needs to encapsulate the second packet into a packet in a form required by a specific network used between the forwarding and processing device 202 and the target storage device. Only in this way, the forwarding and processing device 202 can send the second packet to the target storage device by using an NVMe over Fabric network.

Optionally, the processor 2021 is further configured to: manage hard disk discovery, link establishment, link disconnection, and the like in the target storage device, and provide an in-band or out-of-band management function interface and the like.

Figure 5:
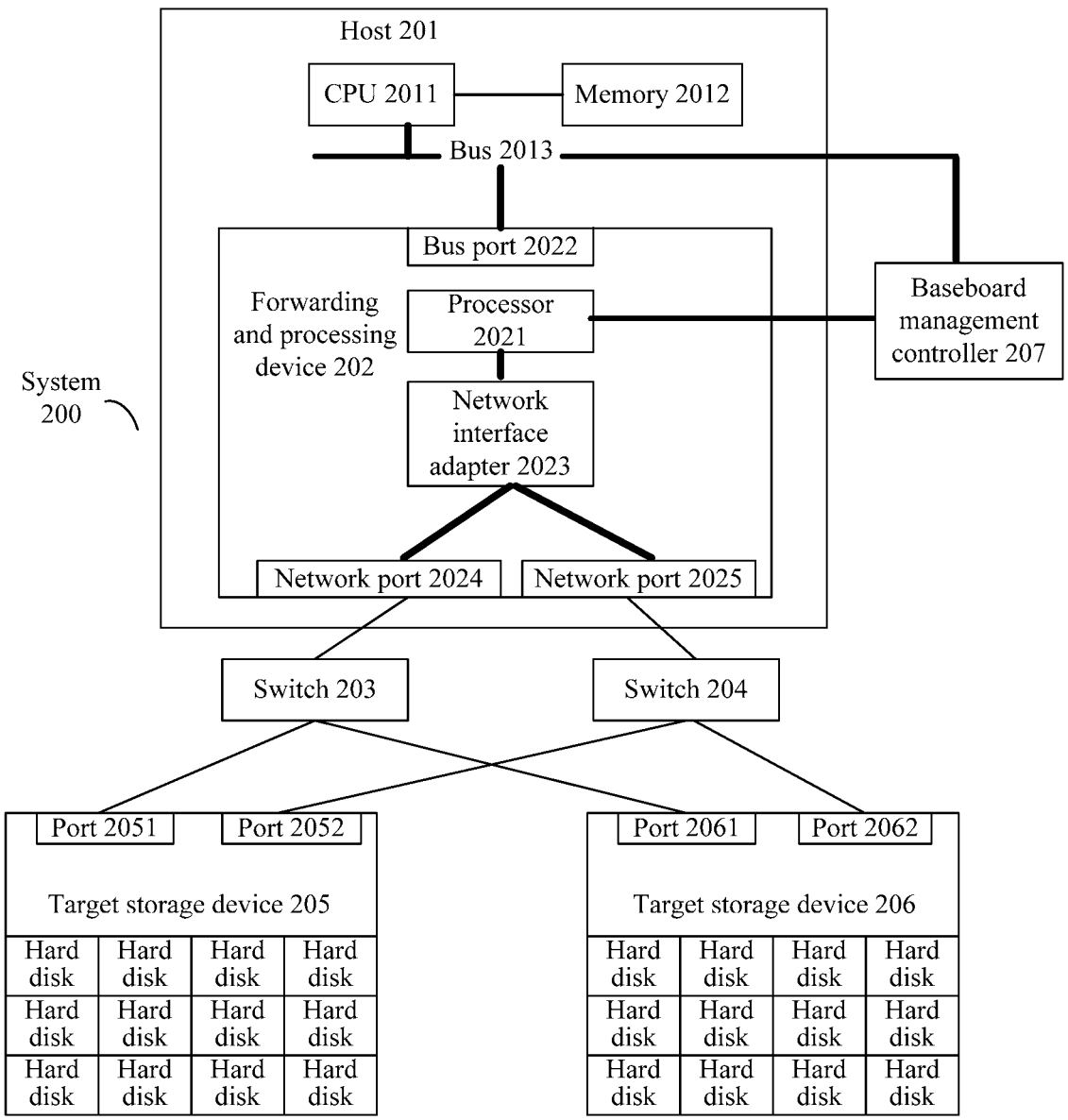
FIG. 5 is a schematic structural diagram of still another implementation of a system 200 according to an embodiment of the present disclosure.

Optionally, in this embodiment of the present disclosure, when the processor 2021 performs in-band management, the processor 2021 receives, by using the bus port 2022 or another port, the management command sent by the CPU 2011, and implements configuration and management according to the received management command, or when the processor 2021 performs out-of-band management, the processor 2021 receives, by using a baseboard management controller (BMC), the management command sent by the CPU 2011. As shown in FIG. 5, the system 200 further includes the BMC 207. The BMC 207 is connected to the CPU 2011 in the host 201 by using a PCIe bus, such as the bus 2013. The BMC 207 may be further connected to the processor 2021 in the forwarding and processing device 202 by using a bus. The bus connecting the BMC 207 and the processor 2021 may be an inter-integrated circuit (I2C), a PCIe bus, or the like. The BMC 207 receives the management command delivered by the CPU 2011, and sends the received management command to the processor 2021 for processing. The management command delivered by the CPU 2011 includes but is not limited to: initialization and interface configuration of the forwarding and processing device 202, and management and authentication of hard disk discovery, link establishment, and link disconnection in the target storage device.

Optionally, in FIG. 5, a network interface adapter 2023 may be further included. The network interface adapter 2023 is connected to the processor 2021, and is connected to the network port 2024 and the network port 2025. The network interface adapter 2023 is configured to forward, to a network by using the network port 2024 or the network port 2025, the packet encapsulated by the processor 2021. When the forwarding and processing device 202 includes the network interface adapter 2023, the network interface adapter 2023 is configured to execute some functions of a network port, that is, forward the packet encapsulated by the processor 2021, so that the packet encapsulated by the processor 2021 can be sent to the NVMe over Fabric network by using the network port (such as the network port 2024 or the network port 2025).

In the foregoing embodiment, after receiving the first packet, the bus port 2022 obtains, according to the PCIe protocol, the input/output command or the management command that complies with the NVMe protocol and that is included in the first packet, and sends, to the processor 2021, the obtained input/output command or management command that complies with the NVMe protocol. In this case, the bus port 2022 runs microcode or a program that is related to the PCIe protocol, parses a received PCIe packet, and obtains the input/output command or the management command that complies with the NVMe protocol and that is included in the PCIe packet sent by the CPU 2011 by using the bus 2013.

In a specific implementation, the bus port 2022 may alternatively not process the first packet, but transparently send the first packet to the processor 2021, and the processor 2021 obtains the input/output command or the management command that complies with the NVMe protocol and that is included in the first packet. In this case, the processor 2021 runs the program that is related to the PCIe protocol, to obtain the input/output command or the management command that complies with the NVMe protocol and that is included in the PCIe packet sent by the CPU 2011 by using the bus 2013.

Further, when the forwarding and processing device 202 receives a packet returned by the target storage device, the processor 2021 receives the packet returned by the target storage device, and decapsulates the received packet, that is, decapsulates, according to a specific network protocol used between the forwarding and processing device 202 and the target storage device, the received packet returned by the target storage device. After decapsulating the received packet returned by the target storage device, the processor 2021 obtains command information or data information that is included in the packet returned by the target storage device, and returns the obtained command information or data information to the host 201.

The following separately describes a manner in which the processor 2021 returns the obtained command information or data information to the host 201 when the packet returned by the target storage device is a returned packet for the data write command, a returned packet for the data read command, or a returned packet for the management command.

When the packet returned by the target storage device is the returned packet for the data write command, the returned packet is data write success or failure information, and the processor 2021 generates, according to the packet returned by the target storage device, a response command that complies with the NVMe protocol, encapsulates the response command into a response command in a form that meets a PCIe forwarding requirement, and returns the encapsulated response command to the host 201 by using the port 2022 or another port that supports the PCIe protocol.

When the packet returned by the target storage device is returned data for the data read command, the returned data is the data that needs to be read, and the processor stores, into the primary storage 2026, the received data that needs to be read, and returns, to the host 201 by means of DMA and by using the port 2022 or another port that supports the PCIe protocol, the data that needs to be read and that is stored in the primary storage 2026.

When the packet returned by the target storage device is the returned packet for the management command, the returned packet may include related data or only a management response message. When the returned packet includes only the management response message and does not include data, a manner in which the processor 2021 sends the obtained management response message to the host 201 is similar to a manner used when the returned packet is the returned packet for the data write command. When the returned packet includes data, a manner in which the processor 2021 sends obtained data and information to the host 201 is similar to a processing manner used when the returned packet is the returned packet for the data read command. Details are not described herein again.

Optionally, in this embodiment of the present disclosure, the forwarding and processing device 202 may be an HBA device. The processor 2021 in the forwarding and processing device 202 may be a CPU (such as a CPU in an ARM architecture or a processor in an x86 architecture), a field programmable gate array (FPGA), an application-specific integrated circuit (ASIC), or any combination thereof.

It should be noted that, in this embodiment of the present disclosure, the packet, such as the second packet, may include a command or data, or may include both a command and data. Any implementation that can implement forwarding or transmission of the command, the data, or other information in an NVMe over Fabric architecture is an implementation of the packet in this embodiment of the present disclosure.

Using the system structure shown in FIG. 3 as an example, the following describes a packet forwarding method provided in an embodiment of the present disclosure.

Figure 6:
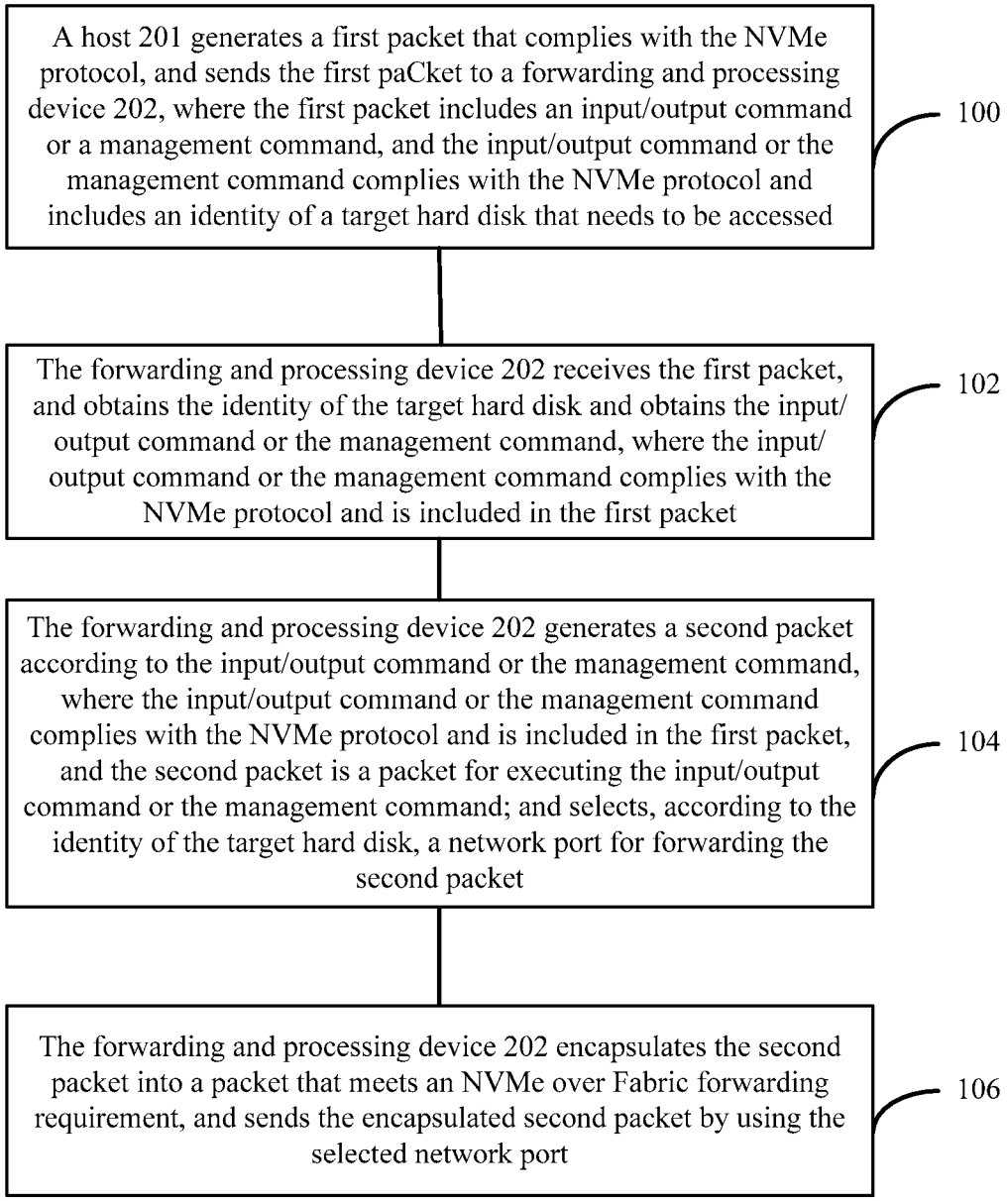
FIG. 6 is a schematic flowchart of a specific implementation of a packet forwarding method according to an embodiment of the present disclosure.

As shown in FIG. 6, FIG. 6 is a schematic flowchart of a specific implementation of a packet forwarding method according to an embodiment of the present disclosure. The method includes the following steps.

Step 100: A host 201 generates a first packet that complies with the NVMe protocol, and sends the first packet to a forwarding and processing device 202, where the first packet includes an input/output command or a management command, and the input/output command or the management command complies with the NVMe protocol and includes an identity of a target hard disk that needs to be accessed.

Only a generic NVMe standard driver needs to be installed on the host 201 for adding, into the first packet, the input/output command or the management command that complies with the NVMe protocol. For example, a standard open-source NVMe driver may be loaded in an operating system of the host 201. Specific adaptive adjustment does not need to be performed on the host 201 for an NVMe over Fabric network. In addition, multipath software does not need to be installed on the host 201, thereby eliminating a problem that the multipath software needs to be compatible with different operating system versions during installation of the multipath software.

In addition, a bus 2013 is a bus based on the PCIe protocol, and the host 201 may send, based on the PCIe bus, a PCIe-based packet to the forwarding and processing device 202. That is, a CPU 2011 sends, to the forwarding and processing device 202 by using the bus 2013, a first packet obtained after encapsulation by using the PCIe protocol.

Step 102: The forwarding and processing device 202 receives the first packet, and obtains the identity of the target hard disk and obtains the input/output command or the management command, where the input/output command or the management command complies with the NVMe protocol and is included in the first packet.

Further, a bus port 2022 is a port that supports the PCIe protocol, that is, the bus port 2022 is physically connected to the bus 2013 by using the PCIe protocol. In this case, the forwarding and processing device 202 can receive, by using the bus port 2022, the first packet that is obtained after encapsulation by using the PCIe protocol and that is sent by the CPU 2011.

In a specific implementation, after receiving the first packet, the bus port 2022 may obtain the input/output command or the management command that complies with the NVMe protocol and that is included in the first packet, and send, to a processor 2021, the obtained input/output command or management command that complies with the NVMe protocol. Alternatively, the bus port 2022 may directly send the first packet to a processor 2021, and the processor 2021 obtains the input/output command or the management command that complies with the NVMe protocol and that is included in the first packet.

Step 104: The forwarding and processing device 202 generates a second packet according to the input/output command or the management command, where the input/output command or the management command complies with the NVMe protocol and is included in the first packet, and the second packet is a packet for executing the input/output command or the management command, and selects, according to the identity of the target hard disk, a network port for forwarding the second packet.

A manner in which the processor 2021 generates the second packet is similar to the foregoing manner implemented by the CPU 2011 when the input/output command or the management command that complies with the NVMe protocol and that is in the first packet is a data write command, a data read command, or a management command. Details are not described herein again.

That the processor 2021 selects, according to the identity of the target hard disk, the network port for forwarding the second packet is similar to the foregoing manner of selecting the network port for forwarding the second packet. Details are not described herein again.

Step 106: The forwarding and processing device 202 encapsulates the second packet into a packet that meets an NVMe over Fabric forwarding requirement, and sends the encapsulated second packet by using the selected network port.

Further, the processor 2021 in the forwarding and processing device 202 encapsulates, according to a network protocol used between the forwarding and processing device 202 and a target storage device (such as a target storage device 205 or a target storage device 206), the second packet into a packet that meets a requirement of the network protocol used between the forwarding and processing device 202 and the target storage device.

According to the foregoing method, multipath software does not need to be installed on the host 201, thereby eliminating complexity caused by a need of matching various possible operating systems during installation of the multipath software on the host 201. In addition, only a generic NVMe standard driver needs to be installed on the host 201 to deliver the NVMe input/output command and management command, and adaptive adjustment does not need to be performed on an operating system according to a specific forwarding requirement of an NVMe over Fabric network, thereby reducing maintenance costs of the host 201. For the host 201, the forwarding and processing device 202 is a device that complies with an NVMe standard. A standard open-source NVMe driver may be loaded in the operating system of the host 201 to send, to the forwarding and processing device 202, the NVMe-related input/output command or management command.

Further, the foregoing method further includes step 108 (not shown in the figure): When the forwarding and processing device 202 receives a response message or data returned by the target storage device (such as the target storage device 205 or the target storage device 206), the processor 2021 receives a packet returned by the target storage device, decapsulates the received packet, and returns the response message or the data obtained after decapsulation to the host 201. That is, the processor 2021 decapsulates, according to the specific network protocol used between the forwarding and processing device 202 and the target storage device, the received packet returned by the target storage device, obtains the response message or the data that is included in the packet returned by the target storage device, and returns the obtained response message or data to the host 201.

Figure 7:
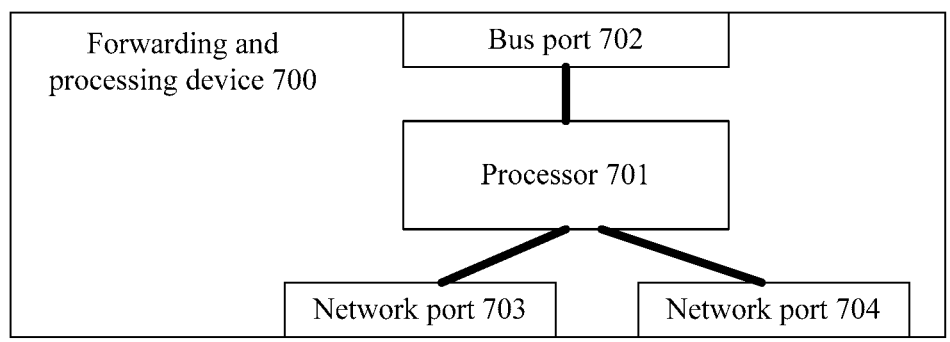
FIG. 7 is a schematic structural diagram of a forwarding and processing device 700 in NVMe over Fabric according to an embodiment of the present disclosure.

Referring to FIG. 7, FIG. 7 is a schematic structural diagram of a forwarding and processing device 700 in NVMe over Fabric according to an embodiment of the present disclosure. The forwarding and processing device 700 includes a processor 701, a bus port 702, and at least two network ports: a network port 703 and a network port 704. The bus port 702 is connected to a PCIe bus. The network port 703 and the network port 704 each are connected to a network. The processor 701 is configured to perform the following steps:

receiving, by using the bus port 702, a first packet sent by a control device in the NVMe over Fabric, and obtaining an input/output command or a management command that complies with the NVMe protocol and that is included in the first packet, where the input/output command or the management command includes an identity of a target hard disk that needs to be accessed;

generating a second packet according to the input/output command or the management command, where the input/output command or the management command complies with the NVMe protocol and is included in the first packet, and the second packet is a packet for executing the input/output command or the management command;

obtaining, according to the identity of the target hard disk, multiple network ports that are in the at least two network ports and that can reach the target hard disk, and selecting, from the multiple network ports, a network port for forwarding the second packet; and encapsulating the second packet into a packet that meets an NVMe over Fabric forwarding requirement, and sending the encapsulated second packet by using the selected network port.

Further, the forwarding and processing device 700 may be implemented with reference to the implementation of the forwarding and processing device 202 in FIG. 2 to FIG. 5, or may be implemented with reference to the implementation of the forwarding and processing device 202 in FIG. 6. Details are not described herein again. For example, the bus port 702 may be implemented with reference to the implementation of the bus port 2022 in FIG. 2 to FIG. 5, and the network port 703 or the network port 704 may be implemented with reference to the implementation of the network port 2024 or the network port 2025 in FIG. 2 to FIG. 5. Details are not described herein again.

Figure 8:
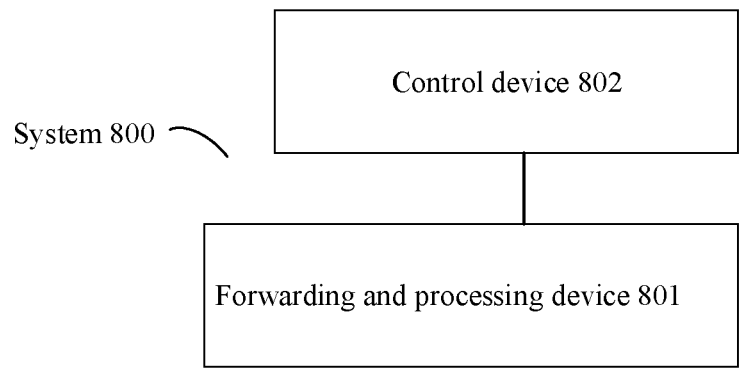
FIG. 8 is a schematic structural diagram of a system 800 in NVMe over Fabric according to an embodiment of the present disclosure.

Referring to FIG. 8, FIG. 8 is a schematic structural diagram of a system 800 in NVMe over Fabric according to an embodiment of the present disclosure. As shown in FIG. 8, the system 800 includes a forwarding and processing device 801 and a control device 802. The forwarding and processing device 801 and the control device 802 are connected by using a PCIe bus.

The control device 802 is configured to send a first packet to the forwarding and processing device 801 by using the PCIe bus, where the first packet includes an input/output command or a management command, and the input/output command or the management command complies with the NVMe protocol and includes an identity of a target hard disk that needs to be accessed.

The forwarding and processing device 801 is configured to: receive the first packet; obtain the identity of the target hard disk and obtain the input/output command or the management command, where the input/output command or the management command complies with the NVMe protocol and is included in the first packet; generate a second packet according to the input/output command or the management command that complies with the NVMe protocol, where the second packet is a packet for executing the input/output command or the management command; obtain, according to the identity of the target hard disk, multiple network ports that are in at least two network ports and that can reach the target hard disk; select, from the multiple network ports, a network port for forwarding the second packet; encapsulate the second packet into a packet that meets an NVMe over Fabric forwarding requirement; and send the encapsulated second packet by using the selected network port.

Further, the system 800 may be implemented with reference to the implementation of the system 200 in FIG. 3 to FIG. 5. That is, the forwarding and processing device 801 may be implemented with reference to the implementation of the forwarding and processing device 202 in FIG. 3 to FIG. 5, and the control device 802 may be implemented with reference to the implementation of the host 201 in FIG. 3 to FIG. 5. Alternatively, the system 800 may be implemented with reference to the implementation in FIG. 6. Details are not described herein again.

Figure 9:
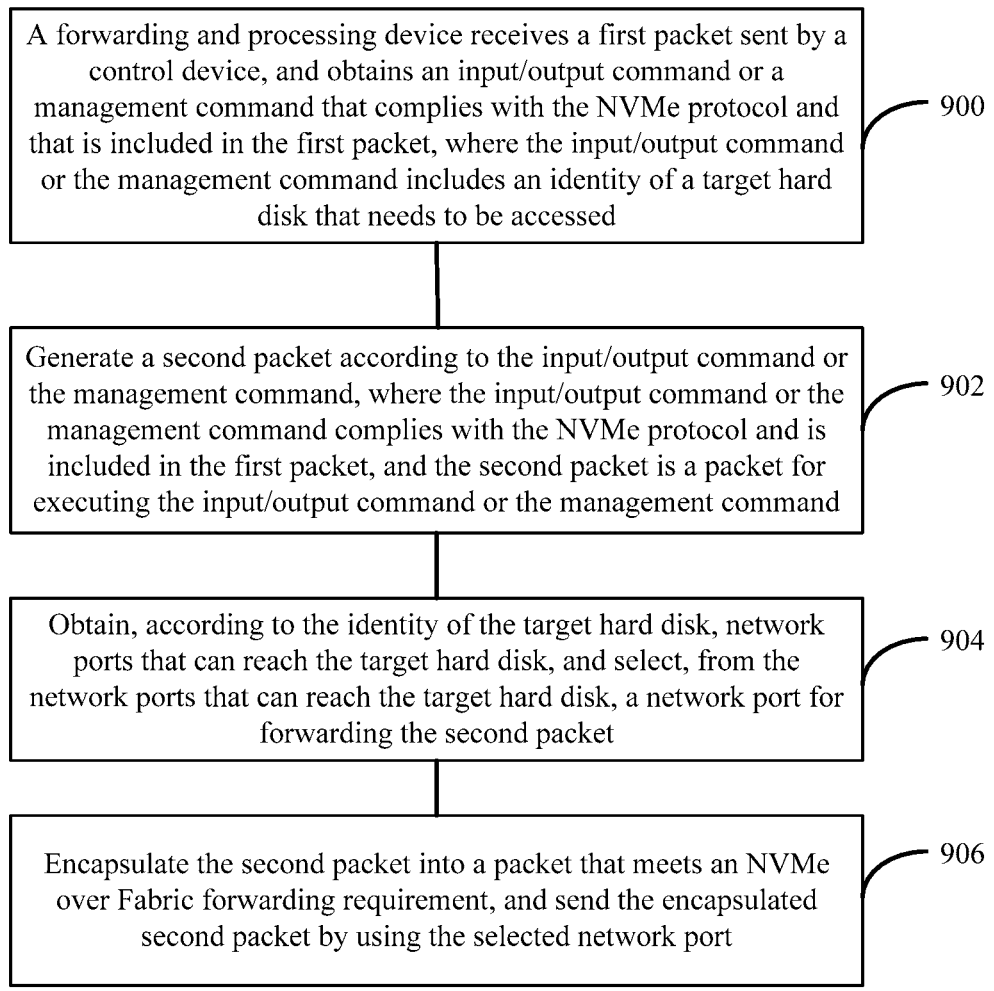
FIG. 9 is a schematic flowchart of a packet forwarding method according to an embodiment of the present disclosure.

Referring to FIG. 9, FIG. 9 is a schematic flowchart of a packet forwarding method according to an embodiment of the present disclosure. The method is applied to packet forwarding in NVMe over Fabric. The NVMe over Fabric architecture further includes a forwarding and processing device and a control device. As shown in FIG. 9, the method includes the following steps.

Step 900: The forwarding and processing device receives a first packet sent by the control device, and obtains an input/output command or a management command that complies with the NVMe protocol and that is included in the first packet, where the input/output command or the management command includes an identity of a target hard disk that needs to be accessed.

Step 902: Generate a second packet according to the input/output command or the management command, where the input/output command or the management command complies with the NVMe protocol and is included in the first packet, and the second packet is a packet for executing the input/output command or the management command.

Step 904: Obtain, according to the identity of the target hard disk, multiple network ports that are in at least two network ports and that can reach the target hard disk, and select, from the multiple network ports, a network port for forwarding the second packet.

Step 906: Encapsulate the second packet into a packet that meets an NVMe over Fabric forwarding requirement, and send the encapsulated second packet by using the selected network port.

A specific implementation of the process shown in FIG. 9 may also be implemented with reference to the implementation described in FIG. 2 to FIG. 6. Details are not described herein again.

The methods or steps described in the disclosed content of the embodiments of the present disclosure may be implemented by hardware, or may be implemented by a processor executing a software instruction. The software instruction may be formed by a corresponding software module. The software module may be stored in a random access memory (RAM), a flash memory, a read-only memory (ROM), an erasable programmable read-only memory (EPROM), an electrically erasable programmable read-only memory (EEPROM), a hard disk, an optical disc, or a storage medium in any other form that is well known in the art. For example, a storage medium is coupled to a processor, so that the processor can read information from the storage medium or write information into the storage medium. Certainly, the storage medium may be a component of the processor.

The units described as separate parts may or may not be physically separated, and parts shown as units may be located in one position, or may be distributed on a plurality of network units. Some or all of the units may be selected according to actual needs to achieve the objectives of the solutions of the embodiments of the present disclosure.

The foregoing descriptions are merely specific embodiments of the present disclosure, but are not intended to limit the protection scope of the present disclosure. Any modification or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A forwarding and processing device in non-volatile memory express (NVMe) over fabric, the forwarding and processing device comprising:
   a processor, a bus port, and at least two network ports, wherein the bus port is connected to a Peripheral Component Interconnect Express (PCIe) bus, the at least two network ports are separately connected to a network, and wherein the processor, bus port, and the at least two network ports are configured to cooperatively operate to:
      receive, via the bus port, a first packet sent by a control device in the NVMe over fabric, wherein the first packet comprises an identity of a target non-volatile memory that needs to be accessed;
      generate a second packet according to the first packet;
      obtain, according to the identity of the target non-volatile memory, multiple network ports, of the at least two network ports, that can reach the target non-volatile memory, and
      select, from the multiple network ports, a network port for forwarding the second packet; and
      encapsulate the second packet into a packet that meets an NVMe over fabric forwarding requirement, and
      send the encapsulated second packet by using the selected network port.

2. The forwarding and processing device according to claim 1, wherein the bus port supports the PCIe protocol and the bus port is configured to:
   receive the first packet sent by the control device;
   obtain an input/output command or a management command that complies with the NVMe protocol and that is comprised in the first packet; and
   send, to the processor, the obtained input/output command or management command that complies with the NVMe protocol and that is in the first packet.

3. The forwarding and processing device according to claim 1, wherein the bus port supports the PCIe protocol and the bus port is configured to:
   receive the first packet sent by the control device; and
   send the first packet to the processor,
   wherein the processor obtains an input/output command or a management command that complies with the NVMe protocol and that is comprised in the first packet.

4. The forwarding and processing device according to claim 1, wherein the at least two network ports are connected to a target storage device through at least one switch, wherein the target storage device includes the target non-volatile memory.

5. The forwarding and processing device according to claim 1, wherein the at least two network ports are connected to a target storage device by using a network of a type taken from the group of network types consisting of: iWarp, remote direct memory access over Converged Ethernet (ROCE), Infiniband, Fiber Channel (FC), and Omni-Path, wherein the target storage device includes the target non-volatile memory.

6. The forwarding and processing device according to claim 1, wherein to encapsulate the second packet, the processor is configured to:
   encapsulate, according to a network protocol used between the forwarding and processing device and a target storage device, the second packet into a packet that meets a requirement of the network protocol used between the forwarding and processing device and the target storage device.

7. A system in non-volatile memory express (NVMe) over fabric, the system comprising:
   a control device; and
   a forwarding and processing device connected to the control device by using a Peripheral Component Interconnect Express (PCIe) bus;
   wherein the control device is configured to send a first packet to the forwarding and processing device by using the PCIe bus, wherein the first packet comprises an identity of a target non-volatile memory that needs to be accessed; and
   wherein the forwarding and processing device is configured to:
      receive the first packet,
      obtain the identity of the target non-volatile memory,
      generate a second packet according to the first packet,
      obtain, according to the identity of the target non-volatile memory, multiple network ports, of at least two network ports, that can reach the target non-volatile memory,
      select, from the multiple network ports, a network port for forwarding the second packet,
      encapsulate the second packet into a packet that meets an NVMe over fabric forwarding requirement, and
      send the encapsulated second packet by using the selected network port.

8. The system according to claim 7, wherein the forwarding and processing device comprises a processor, a bus port, and the at least two network ports, wherein the bus port is connected to the PCIe bus, wherein the at least two network ports are connected to a network, and wherein the processor is configured to:
   receive, by using the bus port, the first packet sent by the control device;
   generate the second packet according to the first packet;
   obtain, according to the identity of the target non-volatile memory, the network ports that can reach the target non-volatile memory,
   select, from the network ports that can reach the target non-volatile memory, the network port for forwarding the second packet;
   encapsulate the second packet into the packet that meets the NVMe over fabric forwarding requirement, and
   send the encapsulated second packet by using the selected network port.

9. The system according to claim 8, wherein the bus port supports the PCIe protocol, and wherein the bus port is configured to:
   receive the first packet sent by the control device;
   obtain an input/output command or a management command that complies with the NVMe protocol and that is comprised in the first packet; and
   send, to the processor, the input/output command or management command that complies with the NVMe protocol and that is in the first packet.

10. The system according to claim 8, wherein the bus port supports the PCIe protocol, and wherein the bus port is configured to:
receive the first packet sent by the control device; and
send the first packet to the processor,
wherein the processor obtains an input/output command or a management command that complies with the NVMe protocol and that is comprised in the first packet.

11. The system according to claim 8, wherein the at least two network ports are connected to a target storage device through at least one switch, and wherein the target storage device includes the target non-volatile memory.

12. The system according to claim 8, wherein the at least two network ports are connected to a target storage device by using a network of a type taken from the group of network types consisting of: iWarp, remote direct memory access over Converged Ethernet (ROCE), Infiniband, Fiber Channel (FC), and Omni-Path,
wherein the target storage device includes the target non-volatile memory.

13. A forwarding and processing device in non-volatile memory express (NVMe) over fabric, wherein the forwarding and processing device comprises:
a processor and at least two network ports, wherein the at least two network ports are separately connected to a network, and the processor is configured to cooperatively operate with the at least two network ports to:
select, from the at least two network ports, a network port for forwarding a packet sent by a control device in the NVMe over fabric;
encapsulate the packet into a packet that meets an NVMe over fabric forwarding requirement, and
send the encapsulated packet by using the selected network port.

14. The forwarding and processing device according to claim 13, wherein the at least two network ports are connected to a target storage device through at least one switch, wherein the target storage device includes the target non-volatile memory.

15. The forwarding and processing device according to claim 13, wherein the at least two network ports are connected to a target storage device by using a network of a type taken from the group of network types consisting of: iWarp, remote direct memory access over Converged Ethernet (ROCE), Infiniband, Fiber Channel (FC), and Omni-Path,
wherein the target storage device includes the target non-volatile memory.

16. A system in non-volatile memory express (NVMe) over fabric, the system comprising:
a control device; and
a forwarding and processing device connected to the control device by using a Peripheral Component Interconnect Express (PCIe) bus,
wherein the forwarding and processing device comprises at least two network ports;
wherein the control device is configured to send a packet to the forwarding and processing device by using the PCIe bus, and
wherein the forwarding and processing device is configured to:
select, from the at least two network ports, a network port for forwarding the packet; and
encapsulate the packet into a packet that meets an NVMe over fabric forwarding requirement, and send the encapsulated packet by using the selected network port.

17. The system according to claim 16, wherein the at least two network ports are connected to a target storage device through at least one switch, wherein the target storage device includes the target non-volatile memory.

18. The system according to claim 16, wherein the at least two network ports are connected to a target storage device by using a network of a type taken from the group of network types consisting of: iWarp, remote direct memory access over Converged Ethernet (ROCE), Infiniband, Fiber Channel (FC), and Omni-Path,
wherein the target storage device includes the target non-volatile memory.

19. The system according to claim 16, wherein the system further comprises a target storage device, and wherein the packet comprises an input/out command or a management command to the target storage device.

20. The system according to claim 16, wherein the system further comprises a target storage device,
wherein the target storage device comprises at least one target non-volatile memory;
wherein the forwarding and processing device is further configured to:
obtain an identity of a target non-volatile memory from the packet;
obtain, according to the identity of the target non-volatile memory, multiple network ports, of at least two network ports, that can reach the target non-volatile memory.

\* \* \* \* \*